United States Patent
Marra

(10) Patent No.: US 9,980,606 B2
(45) Date of Patent: May 29, 2018

(54) MULTIPURPOSE COOKING APPLIANCE

(71) Applicant: Emiliano Marra, Chevy Chase, MD (US)

(72) Inventor: Emiliano Marra, Chevy Chase, MD (US)

(*) Notice: Subject to any disclaimer, the term of this patent is extended or adjusted under 35 U.S.C. 154(b) by 390 days.

(21) Appl. No.: 14/027,226

(22) Filed: Sep. 15, 2013

(65) Prior Publication Data

US 2015/0047512 A1 Feb. 19, 2015

Related U.S. Application Data

(60) Provisional application No. 61/866,573, filed on Aug. 16, 2013.

(51) Int. Cl.
| | |
|---|---|
| *A47J 37/07* | (2006.01) |
| *A47J 37/06* | (2006.01) |
| *F24B 1/22* | (2006.01) |
| *F24C 1/02* | (2006.01) |
| *F24C 15/16* | (2006.01) |

(52) U.S. Cl.
CPC ....... *A47J 37/0647* (2013.01); *A47J 37/0658* (2013.01); *A47J 37/0713* (2013.01); *F24B 1/22* (2013.01); *F24C 1/02* (2013.01); *F24C 15/16* (2013.01); *Y02A 40/928* (2018.01)

(58) Field of Classification Search
CPC ............. A47J 37/0704; A47J 37/0786; A47J 37/0713; A47J 37/0647; A47J 37/0658; A47J 37/0623; A47J 37/067; A47J 37/0629; A23B 4/052; A23B 4/044

USPC ......... 99/339, 340, 391, 395, 397, 398, 393, 99/450, 482; 126/25 R, 9 R, 41 R

See application file for complete search history.

(56) References Cited

U.S. PATENT DOCUMENTS

| | | | |
|---|---|---|---|
| 3,103,161 A | 9/1963 | Whitehead | |
| 4,421,016 A * | 12/1983 | Sich ........................ | A47J 37/04 126/41 B |
| 4,442,763 A | 4/1984 | Beller | |
| 4,765,232 A | 8/1988 | Reid | |
| 4,944,282 A | 7/1990 | Aguiar et al. | |
| 5,410,948 A * | 5/1995 | Eickmeyer ...................... | 99/335 |
| 5,694,917 A * | 12/1997 | Giebel et al. ................ | 126/41 R |
| 6,041,769 A * | 3/2000 | Llodra, Jr. .......... | A47J 37/0759 126/197 |
| 6,135,014 A | 10/2000 | Chang | |
| 8,418,685 B2 * | 4/2013 | Strauch ........................ | 126/25 R |
| 2002/0017290 A1 | 2/2002 | Hines | |
| 2004/0016349 A1* | 1/2004 | Robertson ........... | A47J 37/0763 99/449 |

(Continued)

FOREIGN PATENT DOCUMENTS

| | | |
|---|---|---|
| BR | 8900900 | 1/2011 |
| DE | 10 2010 053741 | 6/2012 |

(Continued)

*Primary Examiner* — Michael Laflame, Jr.
(74) *Attorney, Agent, or Firm* — Clark & Brody

(57) ABSTRACT

A cooking appliance includes at least one multisided element that has more than one cooking surface, the multisided element being mounted on a base so that it can be oriented to present one of the surfaces for cooking. The element can be rotated to present another cooking surface whereby a user can choose a surface to grill food, bake food, smoke food all with the one appliance. As well, the sources of heat can be gas, wood, charcoal, or other sources.

32 Claims, 12 Drawing Sheets

(56) References Cited

U.S. PATENT DOCUMENTS

| | | |
|---|---|---|
| 2004/0149144 A1 | 8/2004 | Qubeka |
| 2005/0039612 A1 | 2/2005 | Denny |
| 2007/0221191 A1* | 9/2007 | O'Brien ............... F24B 1/20 126/25 R |
| 2009/0020111 A1 | 1/2009 | Immordino |
| 2009/0078246 A1 | 3/2009 | Leavens et al. |
| 2009/0308264 A1 | 12/2009 | Estess et al. |
| 2010/0024798 A1* | 2/2010 | Sampson ............... A47J 36/06 126/25 R |
| 2010/0147281 A1 | 6/2010 | Gustaysen |
| 2010/0154773 A1* | 6/2010 | Lee ............... A47J 37/06 126/25 R |
| 2010/0175682 A1* | 7/2010 | Erikson ............... A47J 37/067 126/25 R |
| 2010/0297321 A1* | 11/2010 | Strauch ............... A23L 1/01 426/523 |
| 2011/0174165 A1 | 7/2011 | Todorovic |
| 2012/0037012 A1 | 2/2012 | Stier |
| 2012/0080025 A1 | 4/2012 | Choi |
| 2012/0234308 A1* | 9/2012 | Faulk et al. ............... 126/25 R |
| 2012/0247448 A1 | 10/2012 | Thibodeaux |
| 2013/0125766 A1* | 5/2013 | George ............... A47J 37/044 99/425 |
| 2013/0133527 A1* | 5/2013 | Martin ............... A47J 37/041 99/444 |
| 2014/0261012 A1* | 9/2014 | Perez et al. ............... 99/403 |
| 2015/0000538 A1* | 1/2015 | Emami ............... A47J 37/07 99/443 R |
| 2015/0164278 A1* | 6/2015 | Kohler ............... A47J 37/0623 99/340 |
| 2015/0238049 A1* | 8/2015 | Jones ............... A47J 37/0704 126/25 R |

FOREIGN PATENT DOCUMENTS

| | | |
|---|---|---|
| EP | 2 601 842 | 6/2013 |
| FR | 2845584 | 4/2004 |
| GB | 2 412 296 | 9/2005 |
| WO | 2006/014511 | 2/2006 |

\* cited by examiner

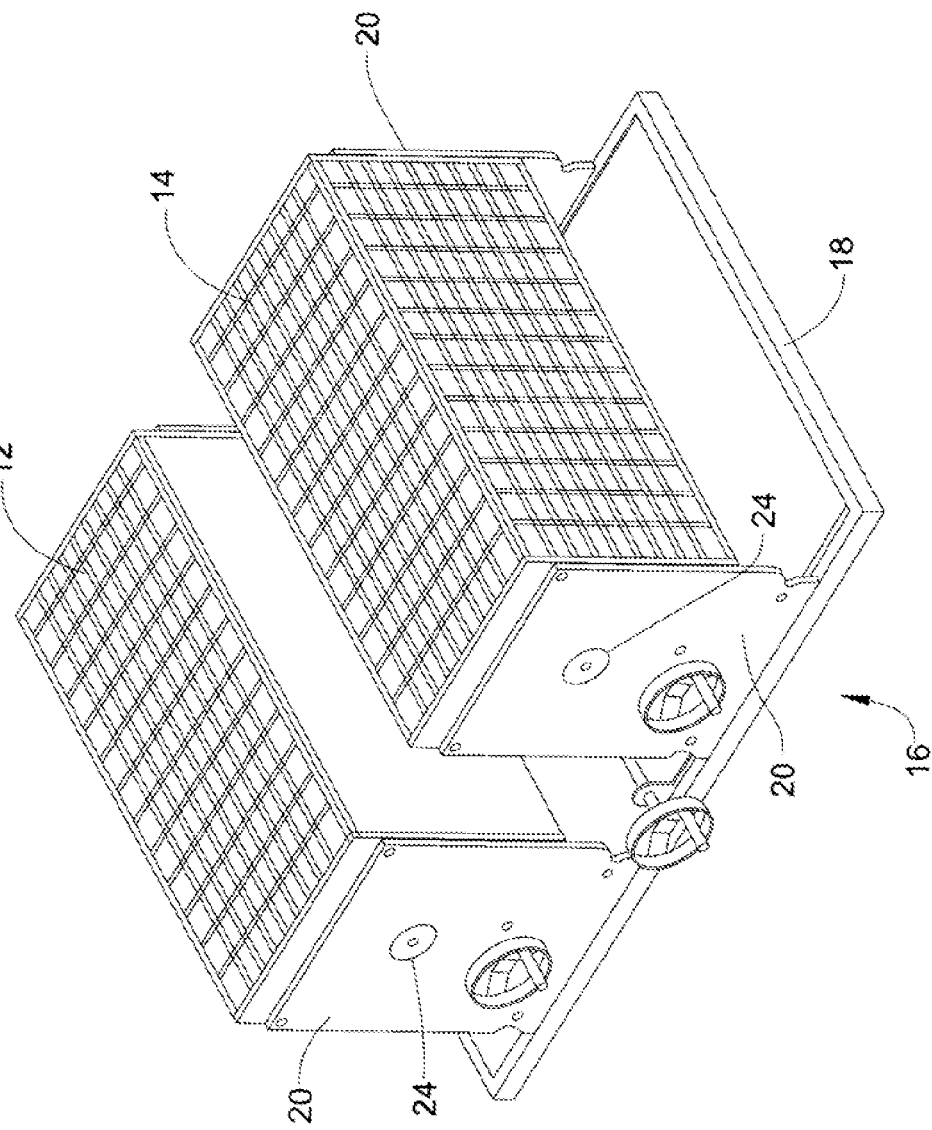

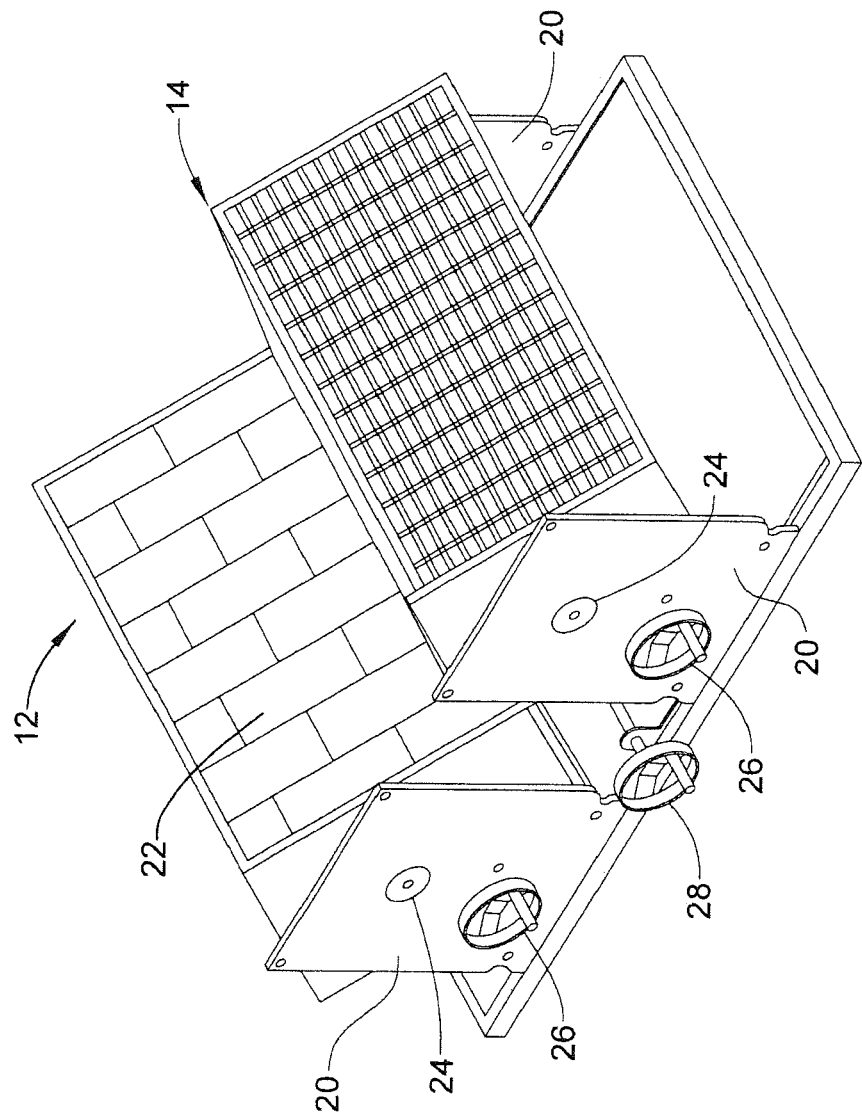

MULTIPURPOSE COOKING APPLIANCE

CROSS REFERENCE

This application claims priority of U.S. provisional application Ser. No. 61/866,573, which was filed on Aug. 16, 2013, and the disclosure of which is incorporated by reference.

TECHNICAL FIELD

This invention relates generally to the art of appliances or equipment used for cooking food of the type generally known as ovens, grills, and smokers, and, in particular, to appliances capable of cooking in any of several ways, separately or simultaneously.

BACKGROUND ART

Many different types of cooking appliances are known. For example, an oven generally has a heated chamber that receives the food to be cooked. The source of heat can be, for example, an electric heater, a gas burner, charcoal, or wood. As well, cooking appliances can be grills using any of these sources of heat as well as smokers that use these sources and also a source of smoke, such as wood chips.

Each type of cooking appliance has unique characteristics, and a chef chooses a particular appliance for that reason. Because a homeowner or even a small restaurant is typically unable to afford several different cooking appliances, the only type of food available will be determined by the particular appliance available. Accordingly, a need exists for a cooking appliance that can easily be converted from one type of cooking appliance to another.

SUMMARY OF THE INVENTION

The cooking appliance of the invention provides several types of cooking structures and can be converted from one to another easily. In one embodiment a cooking appliance can be converted from an oven to a grill. In another embodiment the appliance provides an oven, a gas-fired grill, a charcoal grill, or a smoker and can be converted from one to another or in some instances use more than one type simultaneously.

In one embodiment the cooking appliance of the invention includes a multisided element that provides a grill on one side and an oven surface, such as brick, on another side. The multisided element can be mounted on a base by structure that allows it to be oriented to present the particular cooking surface desired. For example, the various cooking surfaces can be elongated and arranged to form a multisided element with the various cooking surfaces placed about a longitudinal axis whereby a particular cooking surface can be presented by rotating the multisided element. Because the cooking surfaces are typically flat the multisided elements can be geometrically prisms with each cooking surface being rectangular and the surfaces being arranged about a central longitudinal axis. Such a multisided element can be mounted on structure that allows it to rotate so that it is easily rotated to select the desired cooking surface. Alternatively the element can be held by structure that holds it securely but which will receive it in any of several orientations to present the desired surface. If the desired cooking surfaces are not flat other configurations can be used.

In another embodiment two or more of the multisided elements are provided adjacent each other so that the cooking surface is formed by plural but closely adjacent surfaces. When the multisided elements are mounted for rotation they are also preferably mounted to structure that allows them to move away from each other horizontally to provide space between them to allow rotation. After the multisided elements have been rotated sent the desired surfaces, they are moved toward each other so the surfaces are close to each other and present a continuous cooking surface.

In yet another embodiment, different cooking surfaces can be provided at the same time. Thus, a grill type surface can be provided with a pan just below the surface to hold a source of heat such as wood or charcoal for grilling. At the same time however, part of the pan can be provided with a source of smoke for smoking foods, such as meats or vegetables. Because smoking generally requires a cavity to retain the smoke, a cover can be provided only over a portion of the cooking surface. Alternatively, a cover can be provided in sections so that any selected part of a surface can be covered.

A gas burner is a common source of heat, and in the invention a gas burner can be provided within the multisided element. For example an elongate gas burner can be mounted to lie on the longitudinal axis of the multisided element to provide heat to at least the surface that has been moved into a cooking orientation. As well, a gas burner can be located above the multisided element to provide a source of heat to the top of a cooking surface. This structure is particularly advantageous when using the appliance of the invention as an oven.

BRIEF DESCRIPTION OF THE DRAWINGS

FIG. 2 is a perspective of preferred multisided elements and associated support structure used in the appliance of FIG. 1.

FIG. 3 is a perspective of the multisided elements of FIG. 2 in the process of rotating to present different cooking surfaces.

DETAILED DESCRIPTION OF THE DRAWINGS

Figure 1A:
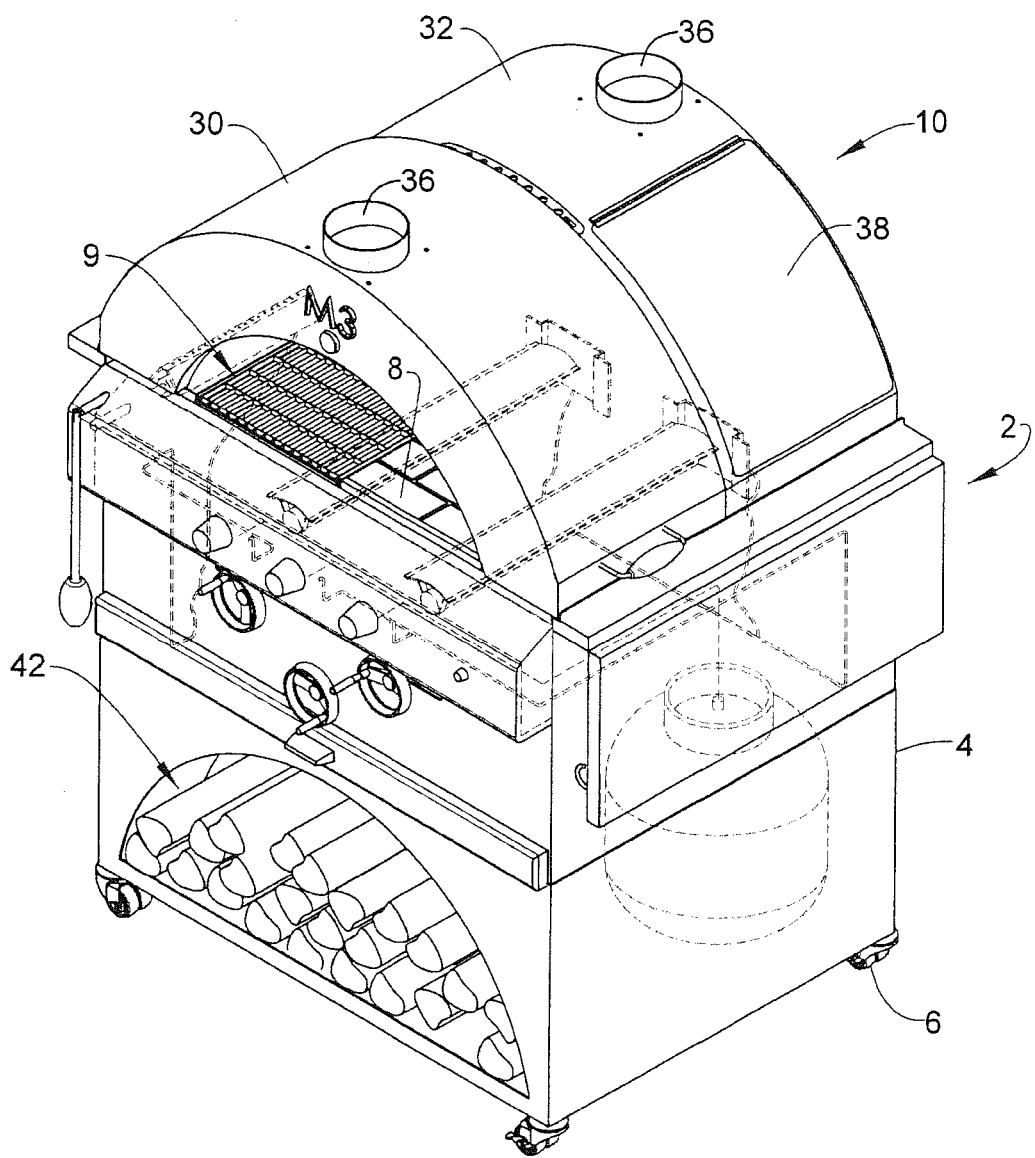
FIG. 1 is a perspective of a cooking appliance in accordance with the invention.
FIG. 1(b) is a perspective of the cooking appliance of FIG. 1(a) showing the cover in a different configuration.
FIG. 1(c) is a perspective of the cooking appliance of FIG. 1(a) showing the cover in another configuration.
FIG. 1(d) is a perspective of the cooking appliance of FIG. 1(a) showing the cover in yet another configuration.
FIG. 1(e) is a top view of the embodiment of FIG. 1(a) with the cover removed.
Figure 1B:
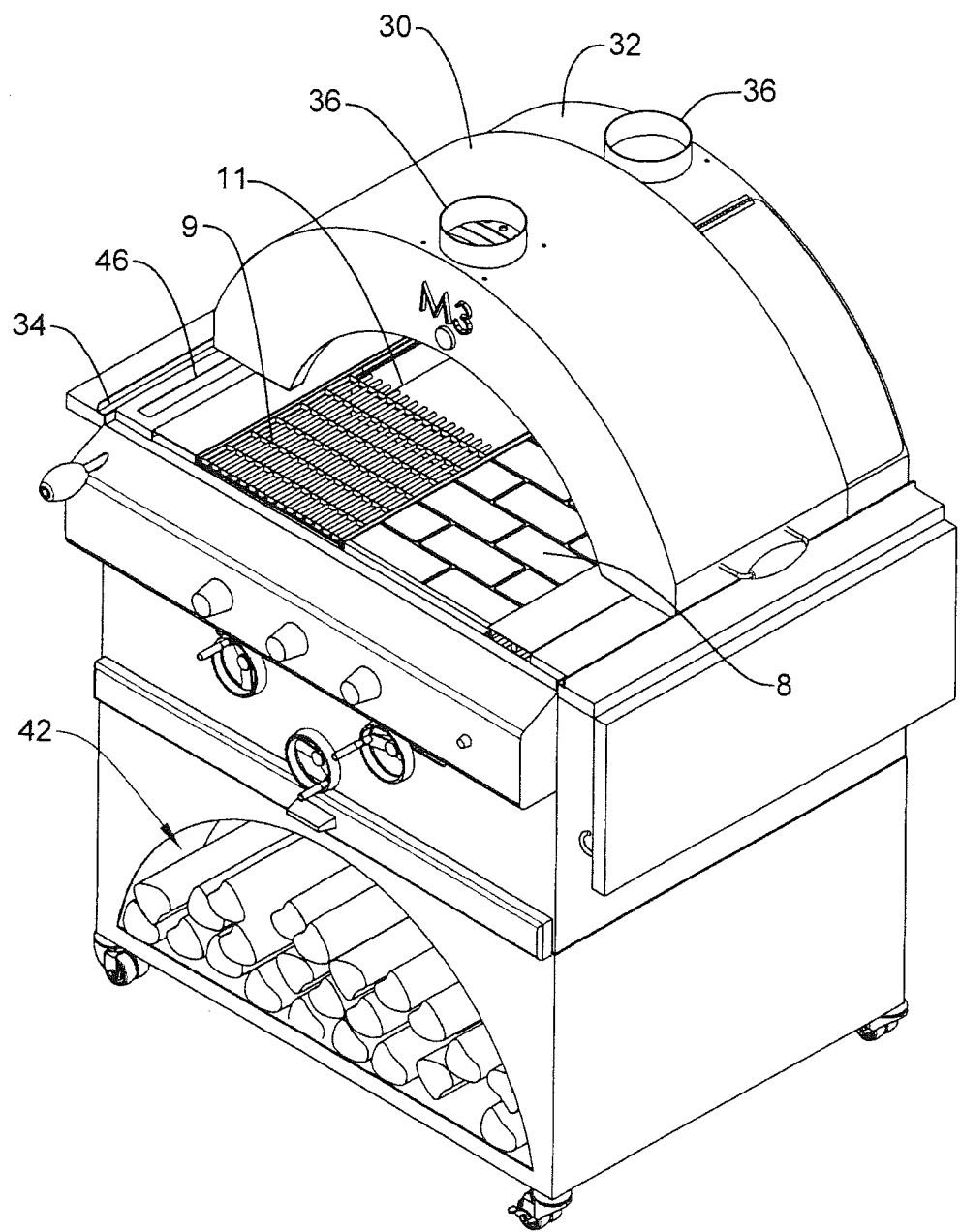
Figure 1C:
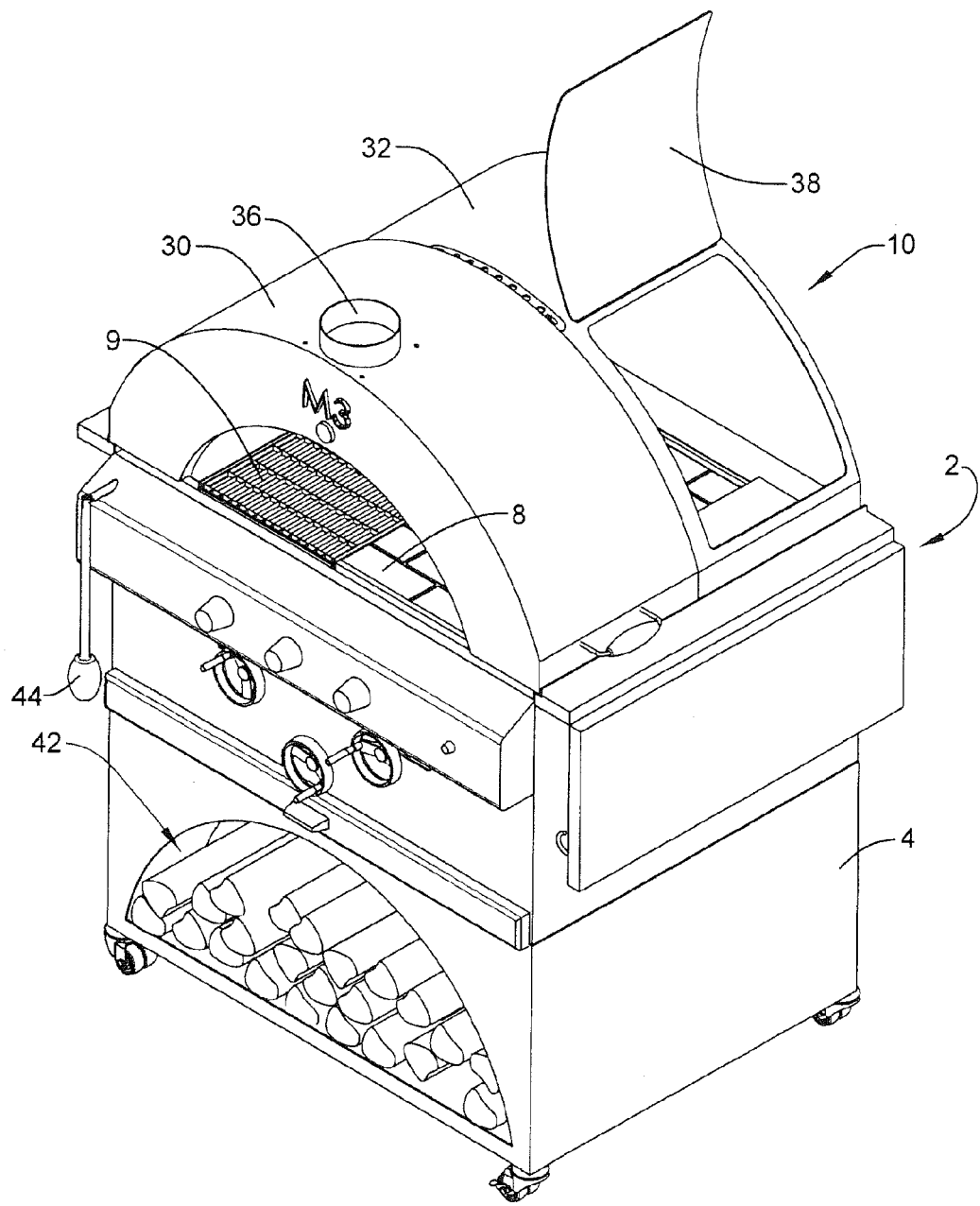
Figure 1D:
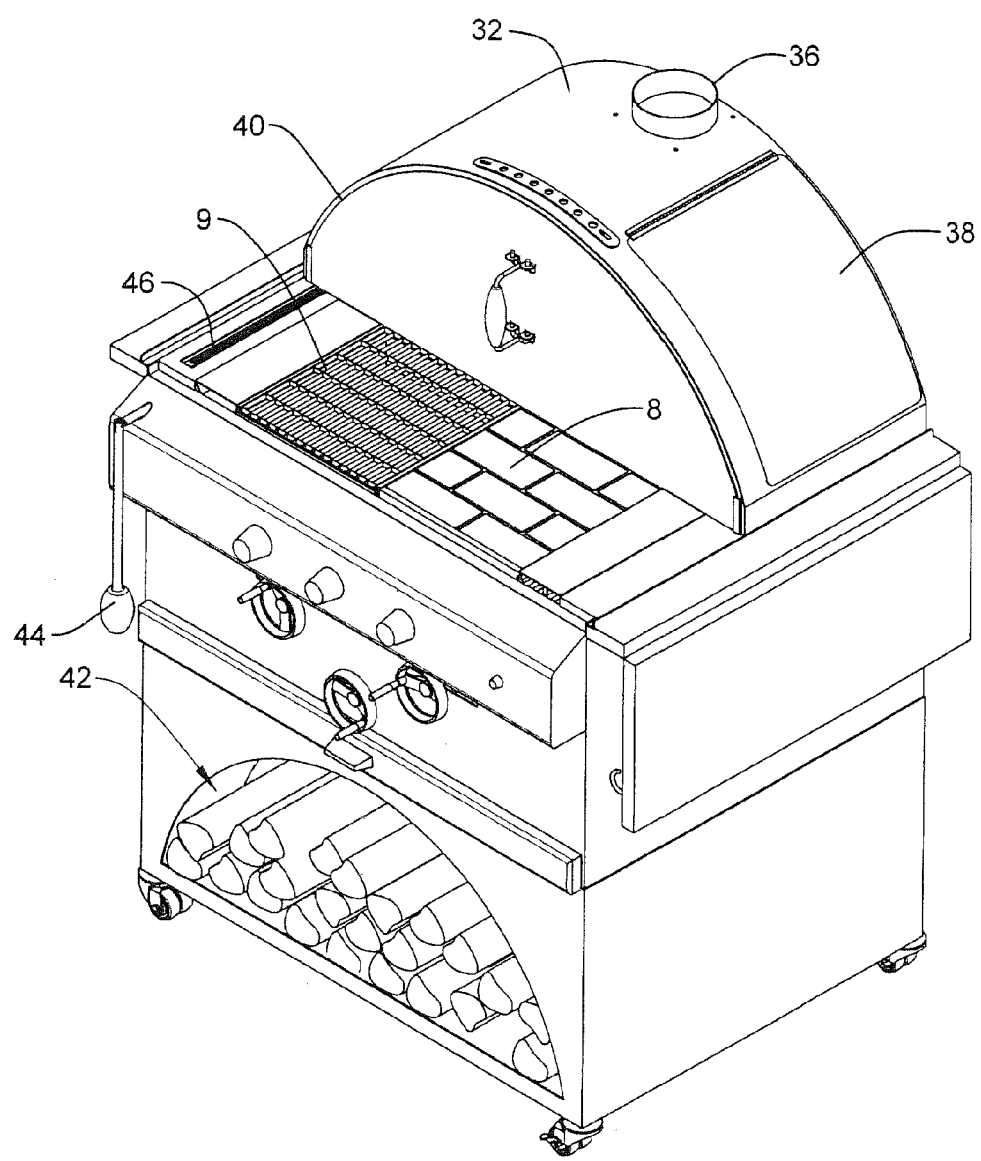
Figure 1E:
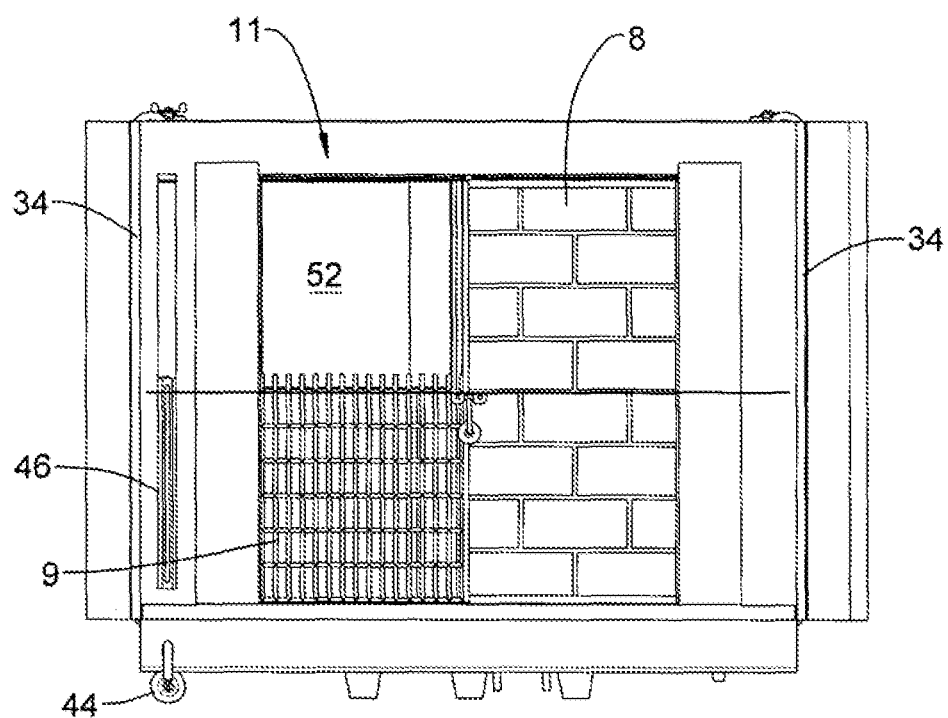

FIG. 1(a) illustrates a cooking appliance 2 in accordance with an embodiment of the invention. Appliance 2 includes a base 4, which is mounted on casters 6 for convenience, as known in the art. The base 2 supports two multisided elements, which will be described in detail below. As illustrated in FIGS. 1(a) and 1(b) the multisided elements are oriented to present an oven surface 8, a grill surface 9, and a smoker surface 11. In the embodiment shown the oven surface 8 is made of bricks that are capable of use at high temperatures, such as those typical in ovens used for cooking pizza. The appliance 2 includes a multipart lid 10 that can cover the cooking surface to form a heated chamber when the appliance is used as an oven as shown in FIG. 1(*a*) as a smoker as shown in FIGS. 1(*b*) and 1(*d*), or in other configurations as selected by the user.

The lid 10 is preferably provided in at least two sections and is mounted to the base so the sections can be moved from the cooking surfaces (e.g., 8, 9, and 11) for providing access to the cooking surfaces. While the lid can be mounted by hinges to allow pivotal movement, in the embodiment shown it is attached by a sliding mechanism to provide flexibility in configuring the appliance for various cooking environments. A handle 44 may be provided to allow the user to move the front section forward and rearward.

In the embodiment of FIG. 1(*a*) the lid 10 is generally cylindrical, but it may be in other shapes. The lid illustrated includes a front section 30 and a rear section 32. The radius of the front section 30 is slightly larger than that of the rear section to allow the front section to slide over the rear section, as illustrated in FIG. 1(*b*). The appliance may be provided with any of several known mechanisms to mount the front section 30 for movement rearward as illustrated, and in the embodiment shown, the upper surface is provided with grooves 34 that receive cooperating structure on the lid (not shown) to facilitate the movement. Further, each of the sections 30, 32 includes a chimney 36 to control movement of air out of the chamber formed by the lid, and each chimney has an adjustable damper (not shown).

The rear section 32 can also have a door 38 to allow access to the interior of the chamber as illustrated in FIG. 1(*c*).

FIG. 1(*d*) shows an embodiment where the front section 30 has been removed (or not provided) and a portable front cover 40 placed on the front of the rear section 32 to provide a completely enclosed cavity. A cover 40 can also be used in any of the embodiments shown in FIG. 1(*a*), 1(*b*), or 1(*c*). This configuration is particularly advantageous when cooking food by the process of smoking. Thus, the smoker surface 11 (see FIG. 1(*b*)) is provided with wood chips or another source of smoke and heat, and the food is placed on the oven surface 8. The cavity is closed by the cover 40, and the air flow is controlled by a damper in the chimney 36. At the same time, the grill surface 9 can be used to grill other pieces of food.

FIG. 1(*a*) also shows a cavity 42 in the base for storing such articles as wood conveniently.

FIG. 1(*e*) is a top view of the upper surface of the appliance, with the lid removed, to illustrate several of the cooking surfaces contemplated. Additionally, FIG. 1(*e*) illustrates the provision of a gas burner 46 adjacent the cooking surface. This burner can be used to heat the cavity formed by the lid, as for cooking pizzas. As well, wood can be placed on the surface 11 or 8 to heat the cavity.

FIG. 1(*e*) also shows the feature of the invention wherein a pan 52 is placed under a selected surface, such as a grill surface illustrated in FIG. 1(*e*) that is to be used with wood as a source of heat or a smoker surface 11 that will be supplied with wood, or wood chips. The pan 52 is held in the space under the grill 9 to provide smoker surface 11 as illustrated in FIG. 1(*e*), but the pan 52 can be used for any of the surfaces that require a source of heat below a surface other than that provided by the centrally located gas burner 48 (see FIG. 4).

FIG. 2 illustrates one embodiment of the invention wherein a first multisided element 12 is mounted adjacent a second multisided element 14 on a support 16. Each side of the multisided elements provides a different cooking surface. For example, one side can be an oven surface made of high temperature brick. Another of the surfaces can be a flat griddle for frying. Another of the surfaces can be a grill. Various other desirable surfaces will be apparent to those of skill in the art.

The support 16 includes a frame 18, which is attached to the base 4, and also includes vertical mounting plates 20. The vertical mounting plates are preferably provided in pairs, with each mounted on a respective side of the frame 18 to support between them a multisided element 12 or 14. In the embodiment illustrated, the multisided elements are attached to the mounting plates for rotation with respect to the plates so each can be rotated about a longitudinal axis extending between a respective pair of mounting plates. While the mounting plates 20 are shown in the drawings as flat and rectangular, it will be appreciated that their primary function is to support the multisided elements and to allow them to rotate. Thus, they can be almost any kind of support structure including, for example, brackets, pillars, etc.

FIG. 3 illustrates the feature of the invention that the multisided elements 12 and 14 can be rotated to present a desired one of the surfaces to the user. The multisided elements shown in FIG. 3 are illustrated in positions midway between changing from a bricked oven surface 22 to a grill surface 9. This is easily accomplished in the embodiment shown because the multisided elements 12 and 14 are mounted on the plates 20 by rotational mounting structures 24, which can be bearings or other known structures that support the multisided elements securely while allowing them to be rotated. Also provided are rotational drive mechanisms 26 by which a user can rotate the multisided elements to present different surfaces. The drive mechanisms 26 illustrated include handles, each of which rotates a respective shaft in response to rotation by the user. The shaft can be connected to the multisided element by a gear mechanism (not shown) or by a flexible belt (not shown), or by any of several other known mechanisms.

The vertical plates 20 are also mounted to the frame 18 for lateral movement to provide spacing between the multisided elements during their rotation. Thus, a separating mechanism 28 is provided so the user can move the multisided elements away from each other to permit rotation of the multisided elements and then to bring them back together for cooking. The separating mechanism can be any of several known mechanisms, such as a shaft with a pinion gear (not shown) that engages racks (not shown) attached to the mounting plates to move the mounting plates and the associated multisided elements linearly toward or away from each in response to rotation of the handle 28. Other mechanisms may be used, including electric motors, scissors-type mechanisms, or even manual sliding mechanisms.

Figure 4:
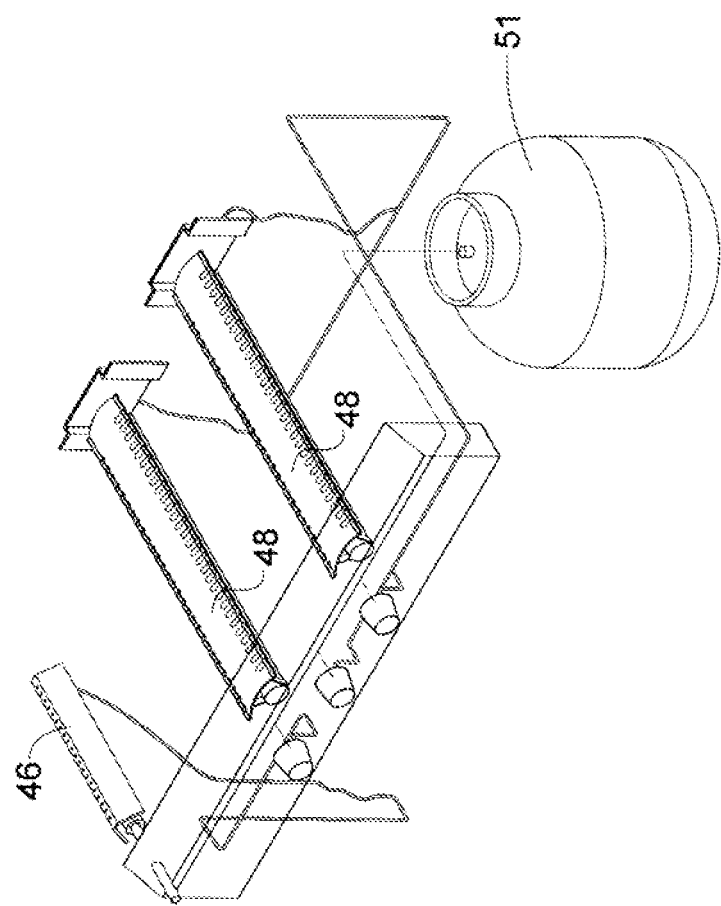
FIG. 4 illustrates the location of gas burners in an embodiment of the invention.

One source of heat useful with the invention is a known gas burner. Such a burner can take any of several forms and can be located in several locations. In one embodiment, the burner is the familiar tube with openings for the gas, and the tube is supported by the vertical plates 20 to lie along the longitudinal axis of a multisided element. FIG. 4 illustrates such an arrangement, where gas burners 48 are located on respective longitudinal axes of the multisided elements and are provided with gas via a known tank 51. Other sources of heat, such as those discussed above and others, as determined by the user, can be used.

Figure 5:
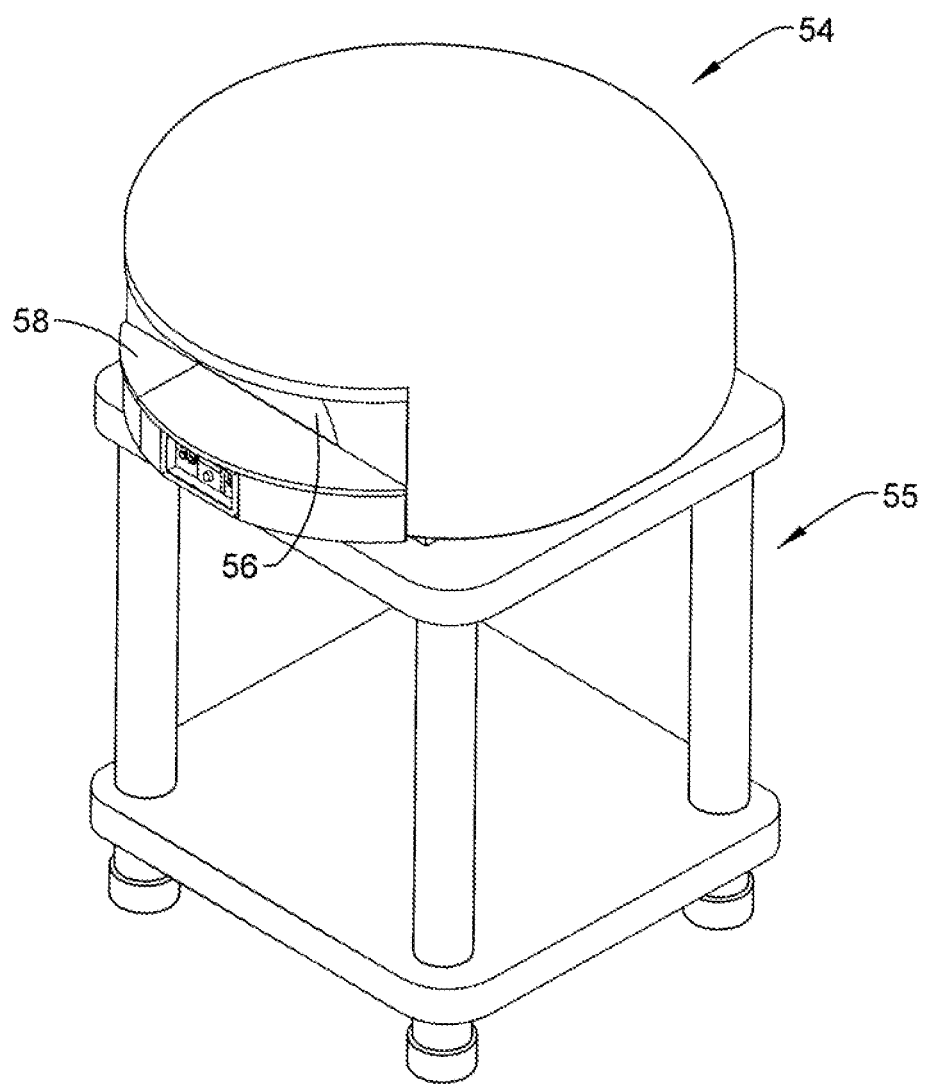
FIG. 5 is a perspective of another embodiment of the invention used with a commercial pizza oven.

FIG. 5 shows an embodiment of the invention where the cooking appliance is in the shape of a commercial pizza oven 54, which is mounted on a stand 55. As is known in the art, the usual pizza oven of the type shown has a dome made of bricks to form a cavity for receiving the food to be cooked, the cavity having a brick floor (not shown). The outer surface of the dome is typically covered with a decorative design made of ceramic elements. An opening 56 is provided through which food is passed into or out of the cooking cavity.

In the embodiment illustrated in FIG. 5, the oven 54 is provided with a door 58 that is mounted to the oven 54 so that it can be moved to expose one or more multisided elements, such as the multisided element 12 described above. In the embodiment shown the door is mounted to the oven by a hinge that allows it to be pivoted away from the oven 54. The door may be mounted to the oven in other ways, however. For example the door 58 can be mounted on the oven by sliding elements that allow the door to be pulled outwardly away from the oven, horizontally or vertically, or provided with hinges to allow it to be pivoted upward or downward, as well as by other structures.

Figure 6:
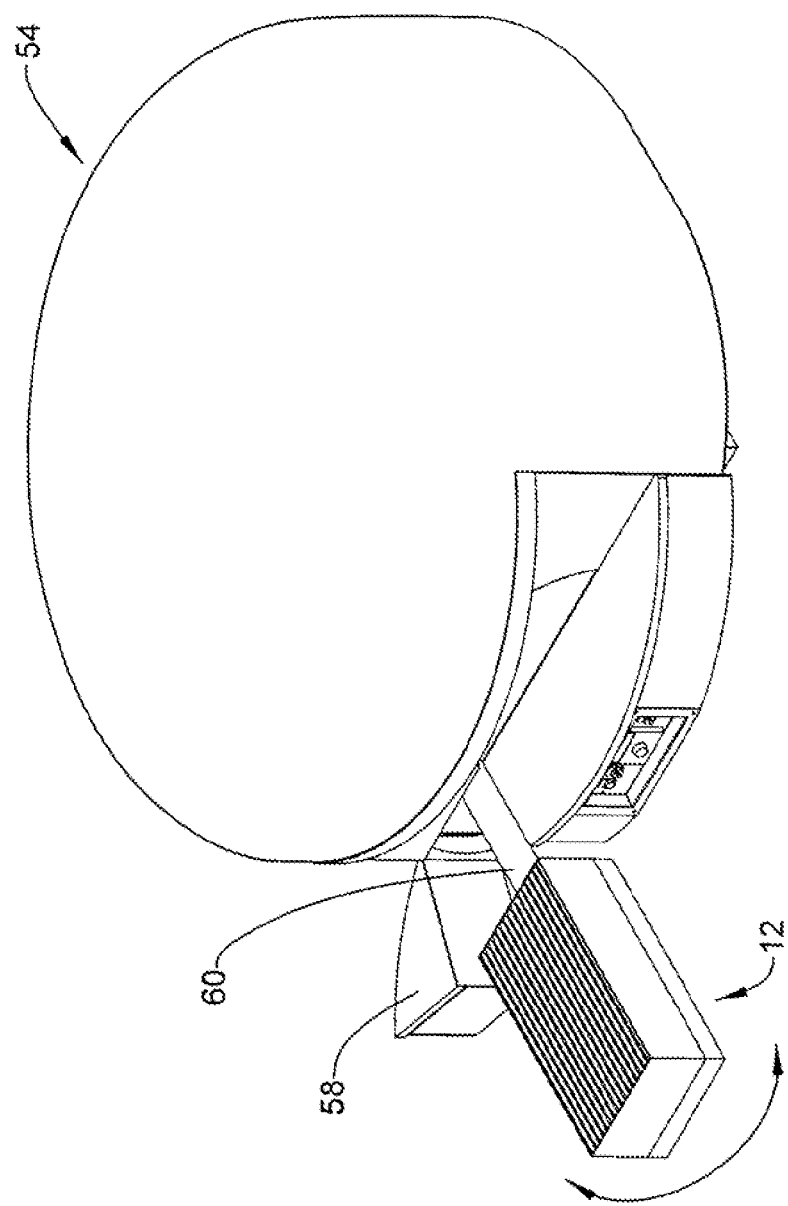
FIG. 6 is a view of the oven of FIG. 5 showing a multisided element displaced from the oven.

With reference to FIG. 6, the door 58 is shown after being pivoted away from the front of the oven to expose a multisided element 12. The multisided element can be mounted to the oven by an extendible element 60 that allows the multisided element to be pulled out of the oven for rotation. The extendible element can be a telescoping element or it can be of fixed length and carried by brackets, if the diameter of the oven is adequate to receive the element when the multisided element is pushed back into the oven cavity. The multisided element can be supported by the oven in a variety of other ways and can be separable from the oven, if it is small enough to allow al person to pull it out, rotate it, and slide it back into the oven.

Figure 7:
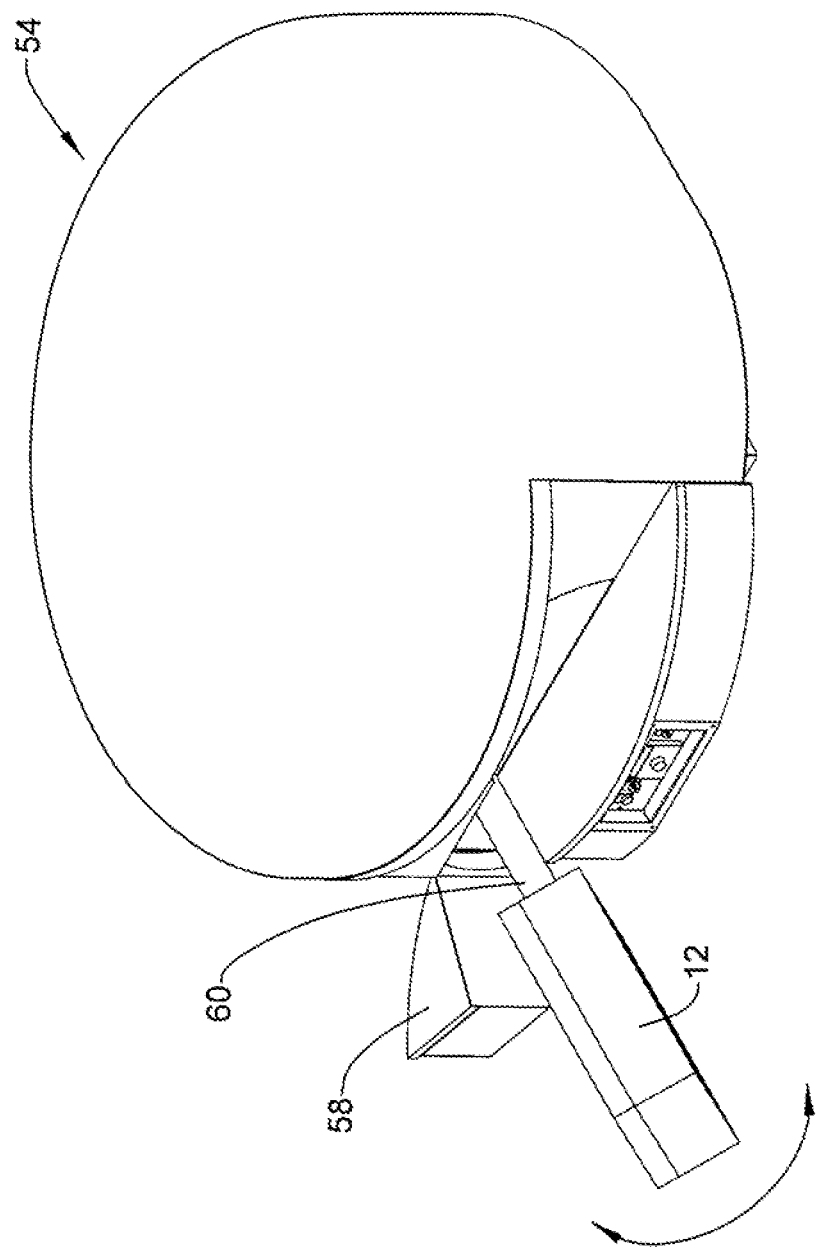
FIG. 7 is a view of the oven of FIG. 5 showing the multisided element being rotated.
Figure 8:
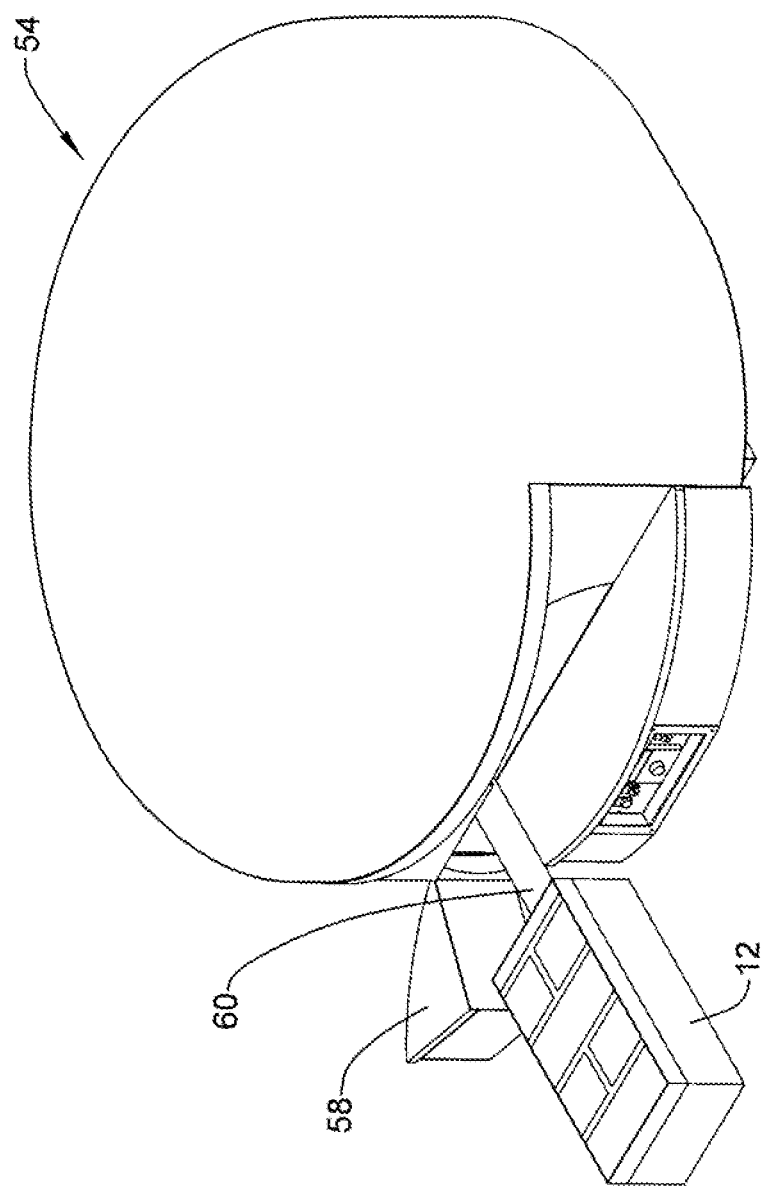
FIG. 8 is a view of the oven of FIG. 5 showing the multisided element after rotation is complete.

FIG. 6 shows the multisided element with a grill surface at the top, FIG. 7 shows the multisided element during rotation, and FIG. 8 shows it after rotation to orient a brick surface at the top. After rotation to place the desired surface at the top, for example, as in FIG. 8, the multisided element is then moved back into the cooking cavity.

The multisided element 12 shown in FIGS. 5 through 8 can be provided with wood chips for smoking, charcoal for heating from below, or heat from a gas burner as described above.

Modifications within the scope of the appended claims will be apparent to those of skill in the art.

I claim:

1. A cooking appliance comprising:
a base, a heat source, and a cooking element mounted to said base, the cooking element providing a cooking surface upon which food can be cooked, characterized by said cooking element having a plurality of separate cooking surfaces, at least one of said separate cooking surfaces being made of a material that is different from that of another of said separate cooking surfaces, said plurality of cooking surfaces being arranged about a central axis in fixed relative positions and mounted to said base to allow said cooking element to be selectively oriented by rotation about said central axis to position a selected one of said separate cooking surfaces for cooking said food, and wherein each of said separate cooking surfaces extends in a direction substantially parallel to said central axis and is circumferentially adjacent another of said separate cooking surfaces.

2. A cooking appliance according to claim 1 comprising two of said cooking elements arranged to be adjacent to each other.

3. A cooking appliance according to claim 2 wherein said cooking elements are mounted to said base for rotational motion about respective longitudinal axes.

4. A cooking appliance according to claim 1 wherein one of said separate cooking surfaces comprises a grill.

5. A cooking appliance according to claim 4 wherein said one of said separate cooking surfaces includes a pan held beneath said grill to support a combustible fuel.

6. A cooking appliance according to claim 1 wherein said heat source comprises a gas burner centrally located with respect to said plurality of separate cooking surfaces.

7. A cooking appliance according to claim 1 wherein one of said separate cooking surfaces comprises high-temperature brick.

8. A cooking appliance according to claim 5 wherein said pan extends beyond said grill.

9. A cooking appliance according to claim 1 wherein said base supports said cooking element for movement with respect to said base.

10. A cooking appliance according to claim 1 further comprising a cover forming a cavity over said selected one of said cooking surfaces.

11. A cooking appliance according to claim 10 wherein said selected one of said cooking surfaces comprises a pan for supporting a combustible fuel.

12. A cooking appliance according to claim 11 wherein one of said separate cooking surfaces comprises a grill and said pan extends beyond said grill.

13. A cooking appliance according to claim 1 further characterized by said heat source being located with respect to said plurality of separate cooking surfaces such that none of said plurality of cooking surfaces is positioned between said heat source and said selected one of said cooking surfaces.

14. A cooking appliance according to claim 1 wherein said cooking element comprises at least three of said separate cooking surfaces.

15. A cooking appliance according to claim 14 wherein two of said at least three of said separate cooking surfaces are rectangular.

16. A cooking appliance according to claim 14 wherein two of said at least three of said separate cooking surfaces are congruent.

17. A cooking appliance according to claim 14 wherein each said central axis is mounted to said base to be horizontal when in use.

18. A cooking appliance comprising:
a base, a heat source, and a cooking element mounted to said base, the cooking element providing a cooking surface upon which food can be cooked, characterized by said cooking element having a plurality of separate cooking surfaces, at least one of said separate cooking surfaces having a cooking characteristic different from a cooking characteristic of another of said separate cooking surfaces, said plurality of cooking surfaces being arranged about a central axis in fixed relative positions and mounted to said base to allow said cooking element to be selectively oriented by rotation about said central axis to position a selected one of said separate cooking surfaces for cooking said food, and wherein each of said separate cooking surfaces extends in a direction substantially parallel to said central axis and is circumferentially adjacent another of said separate cooking surfaces, wherein two of said cooking elements are arranged to be adjacent to each other, are mounted to said base for rotational motion about respective longitudinal axes, and are mounted to said base for linear motion toward and away from each other.

19. A cooking appliance according to claim 18 further comprising means for moving said cooking elements toward and away from each other.

20. A cooking appliance comprising:
a base, a heat source, and a cooking element mounted to said base, the cooking element providing a cooking surface upon which food can be cooked, characterized by said cooking element having a plurality of separate cooking surfaces, at least one of said separate cooking surfaces having a cooking characteristic different from a cooking characteristic of another of said separate cooking surfaces, said plurality of cooking surfaces being arranged about a central axis in fixed relative positions and mounted to said base to allow said cooking element to be selectively oriented by rotation about said central axis to position a selected one of said separate cooking surfaces for cooking said food, and wherein each of said separate cooking surfaces extends in a direction substantially parallel to said central axis and is circumferentially adjacent another of said separate cooking surfaces, wherein said cooking element comprises at least three of said separate cooking surfaces, two of said at least three of said separate cooking surfaces are rectangular, two of said at least three of said separate cooking surfaces are congruent, and further comprising two of said cooking elements, each of said two cooking elements being mounted to said base for rotation about a respective said central axis and said two cooking elements being adjacent each other.

21. A cooking appliance according to claim 20 wherein said cooking elements are mounted to said base for movement toward and away from each other.

22. A cooking appliance comprising:
a base, a heat source, and a cooking element mounted to said base, the cooking element providing a cooking surface upon which food can be cooked, characterized by said cooking element having a plurality of separate cooking surfaces, at least one of said separate cooking surfaces having a cooking characteristic when in a cooking orientation that is different from a cooking characteristic of another of said separate cooking surfaces when in said cooking orientation, said plurality of cooking surfaces being arranged about a central axis in fixed relative positions and mounted to said base to allow said cooking element to be selectively oriented by rotation about said central axis to position a selected one of said separate cooking surfaces for cooking said food, and wherein each of said separate cooking surfaces extends in a direction substantially parallel to said central axis and is circumferentially adjacent another of said separate cooking surfaces.

23. A cooking appliance according to claim 22 wherein one of said separate cooking surfaces comprises a grill.

24. A cooking appliance according to claim 23 wherein said cooking element includes a pan held beneath said grill to support a combustible fuel.

25. A cooking appliance according to claim 24 wherein said pan extends beyond said grill.

26. A cooking appliance according to claim 22 wherein said heat source comprises a gas burner centrally located with respect to said plurality of separate cooking surfaces.

27. A cooking appliance according to claim 22 wherein one of said separate cooking surfaces comprises high-temperature brick.

28. A cooking appliance according to claim 22 further comprising a cover forming a cavity over said selected one of said cooking surfaces.

29. A cooking appliance according to claim 28 wherein said selected one of said cooking surfaces comprises a pan for supporting a combustible fuel.

30. A cooking appliance according to claim 22 further characterized by said heat source being located with respect to said plurality of separate cooking surfaces such that none of said plurality of cooking surfaces is positioned between said heat source and said selected one of said cooking surfaces.

31. A cooking appliance comprising a base, a heat source, and a cooking element mounted to said base, the cooking element providing a plurality of separate cooking surfaces upon which food can be cooked, at least one of said separate cooking surfaces having a first configuration that provides a first cooking characteristic and another of said separate cooking surfaces having a second configuration that is different from said first configuration and that provides a second cooking characteristic that is different from said first cooking characteristic, said plurality of cooking surfaces being arranged about a central axis in fixed relative positions and mounted to said base to allow said cooking element to be selectively oriented by rotation about said central axis to position a selected one of said separate cooking surfaces for cooking said food, wherein each of said separate cooking surfaces extends in a direction substantially parallel to said central axis and is circumferentially adjacent another of said separate cooking surfaces.

32. A cooking appliance according to claim 31 further characterized by said heat source being located with respect to said plurality of separate cooking surfaces such that none of said plurality of cooking surfaces is positioned between said heat source and said selected one of said cooking surfaces.

* * * * *